Oct. 13, 1942.    A. B. WELTY    2,298,445

THRESHER

Filed Dec. 19, 1939

Inventor
Albert B. Welty
By Paul O. Pippel
Att'y.

Patented Oct. 13, 1942

2,298,445

UNITED STATES PATENT OFFICE 2,298,445

THRESHER

Albert B. Welty, Moline, Ill., assignor to International Harvester Company, a corporation of New Jersey Application December 19, 1939, Serial No. 310,012

3 Claims. (Cl. 130—27)

This invention relates to a thresher. More particularly it relates to a novel threshing element for use with a threshing cylinder.

The use of rubber with a threshing cylinder is well known as is also the use of a tooth-type cylinder. The present invention contemplates the use of both of these features.

An object of the present invention is to provide an improved thresher.

A further object is the provision of a bar for a threshing cylinder which is in part formed of rubber and also has tooth-like projections.

According to the present invention the novel threshing element comprises a channel in which an insert of rubber is positioned. The thickness of the rubber is less at one side of the channel than at the other, and at the side of lesser thickness the channel has tooth-like projections extending beyond the surfaces of the rubber insert.

Figure 1:
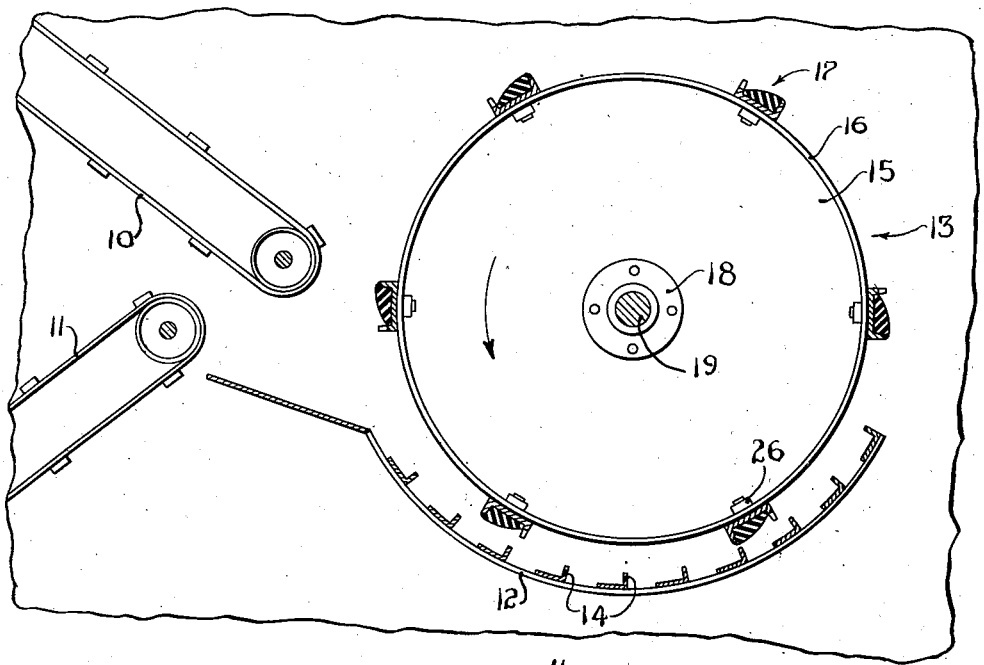
Figure 1 is a sectional elevation through a thresher showing the threshing cylinder with the novel threshing bar attached thereto.
Figure 2:
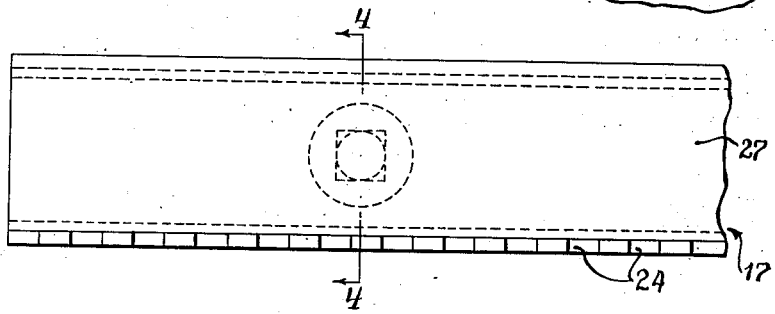
Figure 2 is a plan view of the novel threshing element.
Figure 3:
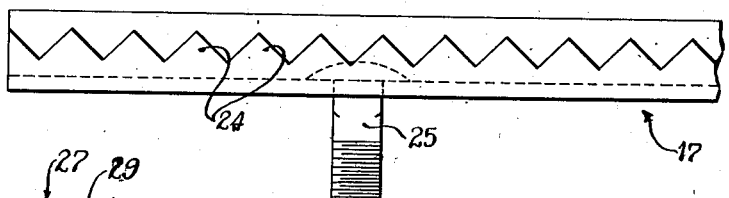
Figure 3 is a side view of the same.
Figure 4:
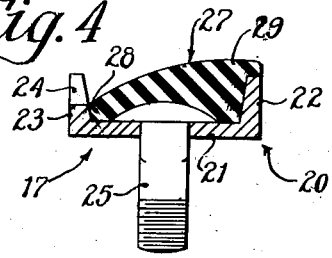
Figure 4 is a sectional view taken along the line 4—4 of Figure 2.

Figure 1 shows a thresher which includes an upper belt conveyer 10 and a lower belt conveyer 11, as well as a concave 12 and a cylinder 13. The concave 12 has a plurality of angle members secured thereto. The threshing cylinder 13 comprises a plurality of plates 15 which have peripheral flanges 16, only one plate being shown, and a plurality of threshing bars or elements 17 secured to the flanges 16 of the plates 15. The plates 15 are secured by means of brackets 18 to a shaft 19.

Each threshing bar or element 17 is formed of a channel 20 composed of metal or other inflexible material and having a base 21 and sides 22 and 23. Notches are cut in the sides 23, so that tooth-like projections 24 are formed. A bolt 25 extends through an opening in the base 21 and, with the aid of a nut 26, serves to retain each threshing bar upon each plate member 15. An insert 27 of rubber or other suitable flexible material is bonded within the channel member 20. The thickness of the insert varies from a minimum at one side 28, where it is equal to the distance from the inner surfaces of the base of the channel to the base of the tooth-like projections 24, to a maximum at the other side 29, where it extends up over the side 22 of the channel. Each bar comprises essentially two elements: one, the tooth-like projections 24 for raking the crops, the other, the insert 27 with its smooth surface for performing the threshing action per se. Thus at one point on the periphery of the cylinder there is a raking element, and at another point somewhat spaced from the raking element, a rubbing or beating element which performs the threshing operation, itself.

In operation the conveyers 10 and 11 cause crops to be threshed to be fed between the cylinder 13 and the concave 12. The cylinder 13 rotates in the direction of the arrow and pulls the crops between itself and the concave 12. The beating action of the threshing elements 17 and the members 14 against the crops causes the threshing. The advantage of the rubber insert in the thresher elements 17 is that there is less danger of cracking of the grain threshed because of the flexibility of the rubber. The tooth-like projections 24, by thinning out the crops, cause the crops to be drawn in more efficiently between the threshing cylinder and the concave and to be acted upon more efficiently by the surface of the rubber inserts 27. Thus, it will be seen that with the novel threshing element 17 the advantages of the use of rubber and the use of a tooth type thresher cylinder are obtained. With the use of the novel elements 17 there is, in effect, provided a threshing cylinder having alternate raking elements and threshing or rubbing elements.

The intention is to limit the invention only within the scope of the appended claims.

What is claimed is:

1. A threshing element adapted to be attached to a threshing cylinder and comprising a member of considerable length adapted to extend generally lengthwise of the threshing cylinder and having a portion provided with notches and adapted to extend generally outwardly from the cylinder, and a rubber part extending along the member in contact with the said portion thereof and varying in thickness from a minimum at one side at the notches to a maximum at the other side spaced rearwardly from the notches in the direction of rotation so as to provide a beating surface extending from the base of the notches to a point considerably radially outward of the base of the notches.

2. A threshing element comprising a channel member of considerable length adapted to be attached to a threshing cylinder so as to extend generally lengthwise thereof and having legs adapted to extend generally outwardly from the threshing cylinder, there being notches in one side and a rubber filler positioned within the channel member and adhering thereto and varying from minimum thickness at the notched side to a maximum thickness at the other side so as to present a beating surface extending from the base of the notches to a point at the other side of the channel considerably radially outward of the base of the notches.

3. A threshing element comprising a channel member of considerable length adapted to be attached to a threshing cylinder so as to extend generally lengthwise thereof and having legs adapted to extend generally outwardly from the threshing cylinder, there being notches in one side, and a rubber filler positioned within the channel member and adhering thereto and varying from minimum thickness at the notched side to a maximum thickness at the other side so as to present a beating surface extending from the base of the notches to a point at the other side of the channel radially outward of the top of the sides.

ALBERT B. WELTY.